Aug. 30, 1932.   H. K. KOUYOUMJIAN   1,875,020
ELECTRIC CONTROLLING APPARATUS
Filed May 27, 1929
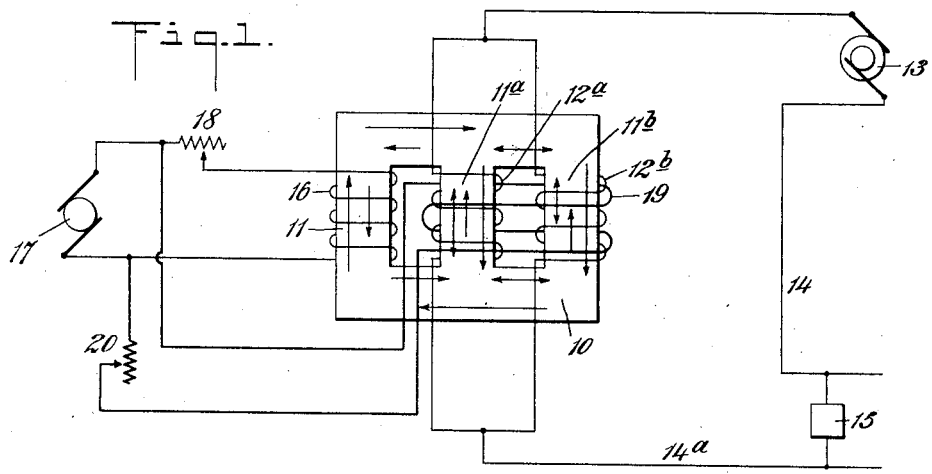
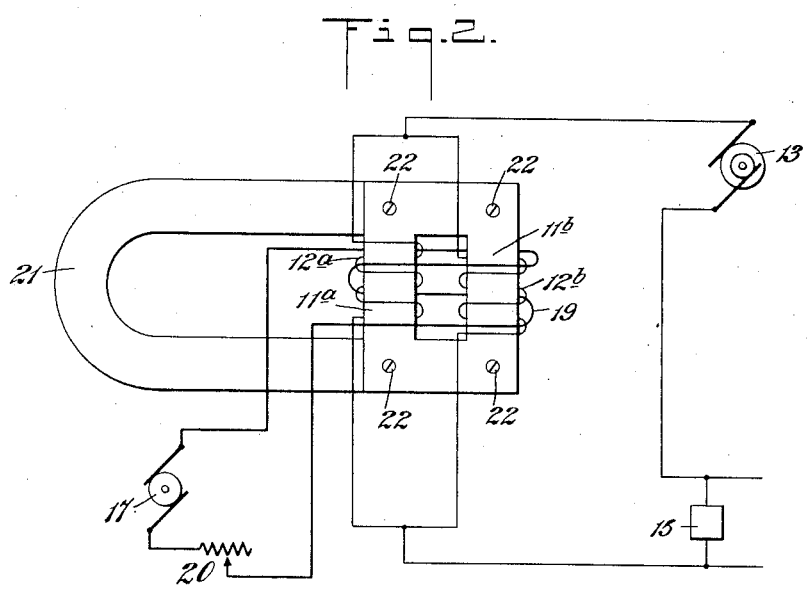
INVENTOR
Haroutiun K. Kouyoumjian
BY
Lawrence K. Sager
ATTORNEY Patented Aug. 30, 1932

1,875,020

UNITED STATES PATENT OFFICE

HAROUTIUN K. KOUYOUMJIAN, OF PROVIDENCE, RHODE ISLAND, ASSIGNOR TO WARD LEONARD ELECTRIC COMPANY, A CORPORATION OF NEW YORK

ELECTRIC CONTROLLING APPARATUS

Application filed May 27, 1929. Serial No. 366,247.

This invention relates to electric controlling apparatus particularly adapted for the control of alternating current circuits.

The main object of the invention is to maintain a substantially constant voltage upon one or more consumption circuits regardless of variations in voltage of the alternating current source and to accomplish this result automatically. Another object is to provide an improved reactor that may be connected in any alternating current circuit for controlling the alternating current energy supplied by the circuit and whereby the voltage supplied to the consumption circuit may be maintained substantially constant. Various types of reactors have been proposed for controlling alternating current consumption circuits for particular purposes, but as regards variations in voltage of the source, or in the supply lines to which the consumption circuit is connected, the greater the increase in voltage, the greater becomes the undesired increase in the consumption circuit. Likewise when the voltage of the source decreases, the voltage of the consumption circuit decreases. By use of the present invention, however, the variations in the voltage of the source, or the supply, are substantially counteracted and a substantially constant voltage is delivered to the consumption circuit, regardless of voltage variations in the source. Other objects and advantages of this invention will be understood by those skilled in the art from the following description and accompanying drawing:

Fig. 1 is a diagram illustrating one embodiment of this invention; and Fig. 2 is a diagram showing a modification.

Referring to Fig. 1, a laminated core 10 is indicated having three legs 11, 11a and 11b joined together at their ends by crosspieces. This core may be built up according to any of the well-known methods and may be of other forms than herein indicated. An alternating current winding 12a and 12b is located upon each of the legs 11a and 11b respectively and are shown connected in parallel with each other in one side of the line connected to the alternating current source 18, or to any other source, such as the secondary of a transformer. The other supply line 14 extends from the source and with the line 14a from the reactor forms the consumption circuit 14, 14a, a translating device 15 being indicated as supplied thereby. Instead of connecting the coils 12a and 12b in parallel with each other, they may, in some cases, be connected in series, although the parallel connection is ordinarily preferable on account of its lower resistance.

On the leg 11 of the reactor is a direct current winding 16 supplied by any suitable direct current source 17, an adjustable resistance 18 being provided for adjustment of the current flow through the winding 16. Another direct current winding 19 is provided which is wound around both legs 11a and 11b of the reactor, thus tending to excite these two legs in common and in the same direction. An adjustable resistance 20 is provided in the circuit of the winding 19 for the adjustment of its current to a desired normal value.

The alternating current windings 12a and 12b are connected in relation to each other so that the alternating current flux path is through the two legs 11a and 11b and the cross-connections at their ends, as in the usual core type transformer.

The direct current winding 16 creates a magnetic flux tending to pass through one crosspiece, then through the two legs 11a and 11b in parallel, and then through the other crosspiece back to the core 11. The coil 19 tends to create a magnetic flux passing through the two legs 11a and 11b in the same direction, then through one crosspiece and through the leg 11, and then back through the other crosspiece to the legs 11a and 11b. The flux created by the coil 16 predominates over that caused by the opposing excitation due to the winding 19. The number of turns of the different windings and proportions of the reactor core will, of course, be made such as to suit the required capacity and to secure the desired control.

For the purpose of explaining the operation more clearly, the tendency of the flux paths, due to the different windings, are indicated by the arrows. The long arrows indicate the paths of the flux due to the direct current winding 16, the short arrows indicate the direction of the flux through the different parts of the core in accordance with the excitation due to the direct current winding 19, and the double-headed arrows indicate the direction and path of the flux due to the alternating current windings 12a and 12b.

The excitation due to the direct current windings, that of the winding 16 predominating, is such as to normally magnetize the portion of the core subjected to flux due to the alternating current quite well up on the bend of the saturation curve, but below the saturation point. The size of the leg 11 within the direct current winding 16 and the strength of current normally passing in the winding 16 are such as to cause this leg of the core to be normally saturated. Assuming now that the voltage of the alternating current supply increases beyond the desired amount, the current flowing in the alternating current windings 12a and 12b will be somewhat increased, but not in proportion to the increase in the alternating current voltage. Let it be assumed that the direction of flux due to the alternating current, at its peak value in one direction, coincides with the direction of the direct current flux in leg 11a and opposes the direct current flux in leg 11b. The additive action of the direct current and alternating current flux in leg 11a, due to this portion of the core being saturated, or near saturation, at that time, has no appreciable effect in the controlling action. In the leg 11b, however, the slightly increased flux due to the alternating current, opposes the flux due to the direct current, which results in causing that leg to be momentarily carried below saturation. This decrease of the flux momentarily permits an increase of current in the direct current winding 19 at the time of the peak of the flux due to the alternating current, because the resulting decrease of the flux in leg 11b is very much greater than the slight increase of flux in the leg 11a, which is then saturated; and this momentary resultant decrease of the flux within the direct current winding 19, permits a momentary increase in value of the direct current. As the winding 19 opposes the direct current winding 16, the momentary increase of current in the winding 19 causes the resultant magnetization of the core, due to the direct current windings, to be decreased. This has the effect, particularly as regards the leg 11b, to cause excitation on a lower portion of the saturation curve, so that the counter electromotive force in the alternating current windings becomes more effective, and thus largely counteracts the increase in voltage of the alternating current supply line, and thus prevents the voltage applied to the load from being materially increased above the normal voltage. Obviously, the same controlling effect as above described occurs when the alternating current is assumed to flow in the reverse direction, the leg 11a being then carried below saturation instead of the leg 11b. The controlling effect thus results from a series of momentary changes in value of the direct current, that is, from a series of ripples imposed upon the direct current.

Similarly, when the supply voltage decreases below the normal amount, the reverse action takes place causing a resultant decreased counter-electro-motive force in the alternating current windings of the reactor and thus preventing the voltage delivered to the consumption circuit, or translating device, from being objectionably decreased.

In the modification shown in Fig. 2, the leg 11 and winding 16 of Fig. 1 are replaced by a permanent magnet 21, the other portions of the reactor remaining the same. The ends of the permanent magnet are shown as being placed over and extending the length of the end pieces of the reactor, being secured thereto by through bolts 22. Any other suitable method of uniting the permanent magnet magnetically to the laminated reactor core may be used provided the magnetic flux due to the permanent magnet is caused to pass in parallel through the two legs 11a and 11b of the reactor. The operation is, in general, the same as that described with reference to the construction shown in Fig. 1, the permanent magnet tending to create a constant flux under all operating conditions. The form of this invention shown in Fig. 2 is well adapted for comparatively small units, and where the capacity of the devices supplied by the consumption circuit is comparatively small.

Although my invention has been described particularly with reference to the apparatus shown in the accompanying drawing, yet it will be understood that the invention may be embodied in other forms of apparatus, and that the windings and their circuit connections may be varied from those shown to suit particular requirements, and without departing from the scope of this invention. It will also be understood that the windings may be relatively located to suit particular purposes and may be superimposed, if desired, or otherwise located; and it will be understood that the accompanying drawing is diagrammatic for the sake of clearness and to aid in understanding the construction generally and the basic principles of operation.

I claim:

1. A reactor for alternating current circuits comprising a core, an alternating current winding thereon, a direct current winding on said core, said direct current winding being subjected to the total flux due to said alternating current winding, and a second direct current winding on said core for magnetizing said core, said second direct current winding not being subjected to the flux due to said alternating current winding.

2. A reactor for alternating current circuits comprising a core, an alternating current winding thereon, a direct current winding on said core, said direct current winding being subjected to the total flux due to said alternating current winding, and a second direct current winding on said core for magnetizing said core, said second direct current winding not being subjected to the flux due to said alternating current winding and wound upon a normally saturated portion of said core.

3. The combination with an alternating current source and a consumption circuit, of a core having at least two legs, an alternating current winding on each of said legs acting cumulatively to create alternating flux through said legs, said windings being connected in series in said consumption circuit, means applied to said core for creating an approximately constant flux in one direction through said legs in parallel, and a direct current winding enveloping said legs tending to create a flux acting in opposition to that of said means.

4. The combination with an alternating current source and a consumption circuit, of a core having at least three legs, an alternating current winding on two of said legs acting cumulatively to create alternating flux through said two legs, said winding being connected in series in said consumption circuit, a direct current winding on the third leg creating a flux passing through said two legs in parallel, said third leg being saturated, and a direct current winding enveloping said two legs and tending to create a flux acting in opposition to that of said first-named direct current winding.

5. The combination with an alternating current source and a consumption circuit, of a core having at least two legs, an alternating current winding on each of said legs acting cumulatively to create alternating flux through said legs, said windings being connected in series in said consumption circuit, means applied to said core for creating an approximately constant flux in one direction through said legs in parallel, a direct current winding enveloping said legs tending to create a flux acting in opposition to that of said means, and a source of direct current of approximately constant voltage for supplying current to said direct current winding.

6. The combination with an alternating current source and a consumption circuit, of a core having at least three legs, an alternating current winding on two of said legs acting cumulatively to create alternating flux through said two legs, said winding being connected in series in said consumption circuit, a direct current winding on the third leg creating a flux passing through said two legs in parallel, said third leg being saturated, a direct current winding enveloping said two legs and tending to create a flux acting in opposition to that of said first-named direct current winding, and a source of direct current of approximately constant voltage for supplying current to said direct current windings.

HAROUTIUN K. KOUYOUMJIAN.